Feb. 14, 1961 R. A. HENLE 2,971,696
BINARY ADDER CIRCUIT
Filed Feb. 26, 1954
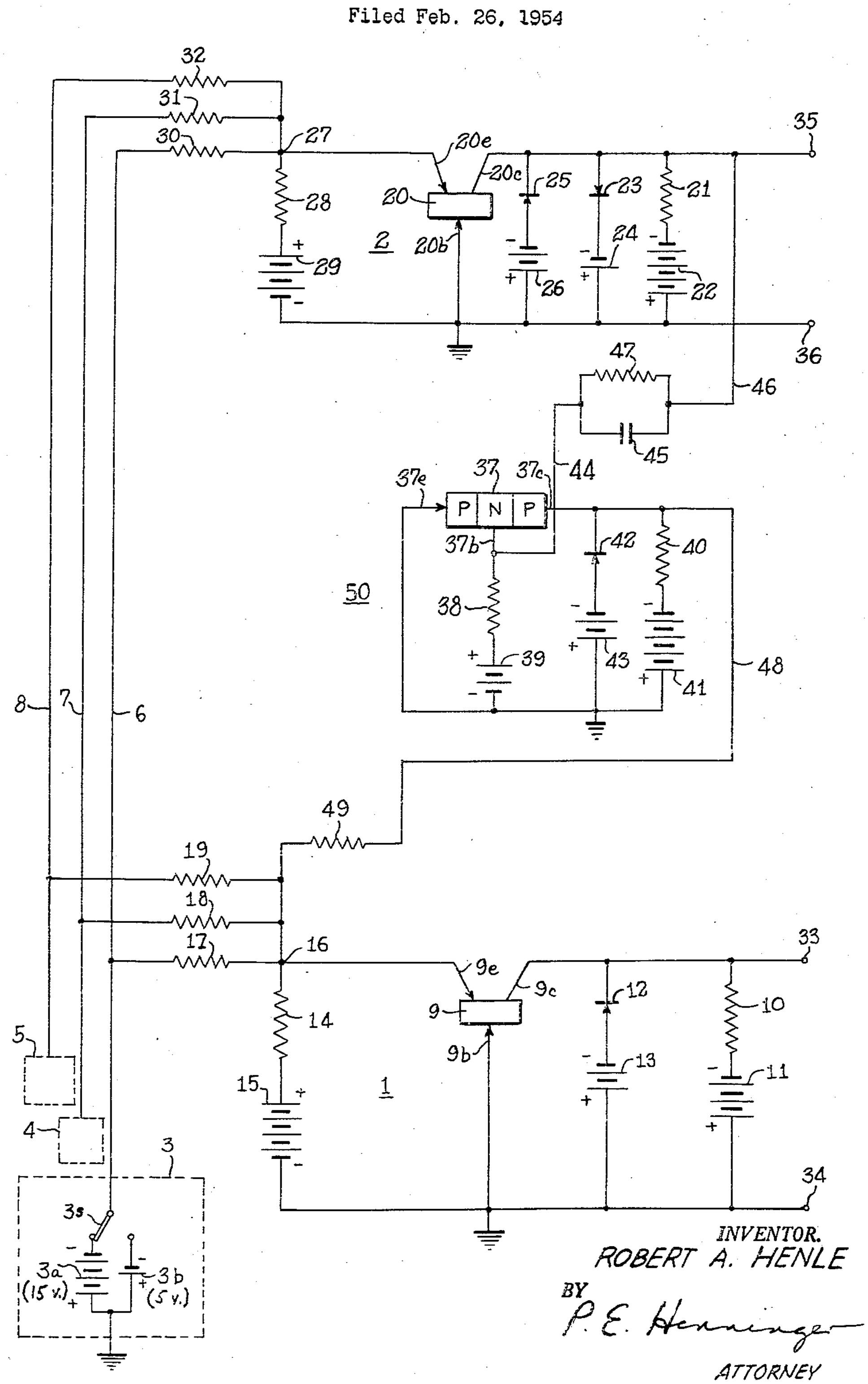
INVENTOR.
ROBERT A. HENLE
BY
P. E. Henninger
ATTORNEY United States Patent Office 2,971,696
Patented Feb. 14, 1961

2,971,696

BINARY ADDER CIRCUIT

Robert A. Henle, Hyde Park, N.Y., assignor to International Business Machines Corporation, New York, N.Y., a corporation of New York Filed Feb. 26, 1954, Ser. No. 412,697
1 Claim. (Cl. 235—176)

This invention relates to binary adder circuits and especially to binary adder circuits employing transistors.

Binary adder circuits may be defined as circuits which produce a series of binary output signals representing the sum of individual input signals. Such circuits have been constructed using the Kirchhoff principle, i.e., algebraic addition of currents flowing into a junction. Binary adder circuits typically include, for each given numerical order, three sets of input terminals, two for incoming digits of the given order to be added, and one connected to the carry output terminal of the next lower order, a set of sum output terminals, whose "On" or "Off" output condition indicates the sum of the digits in the given order, and a set of carry output terminals, whose "On" or "Off" output condition determines whether a carry signal is transmitted to the carry input terminals of the next higher order. In such an adder, the counting circuit which controls the condition of the sum output terminals is termed the sum circuit, and the counting circuit which controls the condition of the carry output terminals is termed the carry circuit. Such circuits are known using vacuum tubes as translating and amplifying devices, and some such circuits have been suggested using transistors. Transistor binary adder circuits of the prior art have been complex. Because of the high gain requirements in order to secure consistent stable operation, each counting circuit in the binary adder has commonly included two or more transistors.

There is described in the U.S. Patent No. 2,609,428, issued to Harold B. Law on September 2, 1952, a transistor which employs an asymmetrically conductive base electrode instead of the more conventional ohmic base electrode. The Law type of transistor has very high current gain characteristics as compared to conventional transistors, and it is therefore particularly suitable for use in applications where high gain is necessary.

An object of the present invention is to provide an improved binary adder circuit including transistors of the Law type.

Another object is to provide an improved counting circuit for use in a binary adder.

Another object is to provide an improved two's counting circuit for use in a binary adder.

The foregoing and other objects of the invention are attained in the binary adder described herein by providing a sum circuit employing a single transistor of the Law type, a carry circuit employing a single transistor of the Law type, and an inverter circuit interconnecting the output of the carry circuit with the input of the sum circuit and employing a single PNP junction transistor.

The carry circuit, which may be termed a two's counting circuit, includes a novel output network including an arrangement which limits the circuit to two output states, one of which is attained when the number of concurrent input signals is less than two and the other of which is attained when the number of concurrent input signals is two or more.

Other objects and advantages of the present invention will become apparent from a consideration of the following specification and claim, taken together with the accompanying drawing.

The single figure of the drawing is a wiring diagram of an electric circuit embodying the invention.

The binary adder shown in the drawing includes a sum circuit generally indicated at 1, a two's counting carry circuit generally indicated at 2 and an inverter circuit generally indicated at 50. Input signals are supplied to the sum and carry circuits from three signal generators 3, 4 and 5. The signal generators are similar. While any suitable signal generator construction may be used which will produce electric signals of the required current and potential characteristics, the internal structure of signal generator 3 is shown, by way of example, as including a switch 3*s* and batteries 3*a* and 3*b*. The switch 3*s* is movable between the Off position shown, in which the negative terminal of battery 3*a* is connected to an input wire 6, and an On position in which the negative terminal of battery 3*b* is connected to the wire 6. Similar input wires 7 and 8 are provided for the generators 4 and 5.

The sum circuit 1 includes a transistor 9 of the type described in the Law patent mentioned above, having an emitter electrode 9*e*, a collector electrode 9*c* and an asymmetrically conductive base electrode 9*b*. The base electrode 9*b* is connected directly to ground. The collector electrode 9*c* is connected to ground through a load resistor 10 and the battery 11. In parallel with the load resistor 10 and battery 11 between collector 9*c* and ground is a branch circuit including an asymmetric impedance element 12 and a battery 13. This branch circuit is provided to decrease the transistor "fall" time by a method well known in vacuum tube switching circuits. Specifically, this branch limits the most negative potential which the collector 9*c* can attain to substantially the potential of battery 13. The "fall" time is therefore limited to the time required to "fall" to the potential of the negative terminal of battery 13, rather than to the more negative potential of the negative terminal of battery 11. In other words, this branch circuit establishes the maximum negative potential for collector 9*c*.

The emitter electrode 9*e* is connected to the grounded base electrode 9*b* through a biasing branch circuit including a resistor 14 and a battery 15. At a junction 16 between resistor 14 and emitter 9*e*, a Kirchhoff addition of currents takes place which is significant in the operation of the sum circuit 1. Junction 16 is connected to the input lines 6, 7 and 8 through resistors 17, 18 and 19, respectively.

The two's counting carry circuit includes a transistor 20 of the Law type having an emitter electrode 20*e*, a collector electrode 20*c* and an asymmetrically conductive base electrode 20*b*. Collector 20*c* is connected to the grounded base 20*b* through a circuit branch including a conventional load resistor 21 and a battery 22. Connected in parallel with this branch are two other branches, one comprising an asymmetric impedance element 23 and a battery 24 in series, the other comprising an oppositely poled impedance element 25 and a battery 26 in series. The branch including impedance element 23 and battery 24 limits the negative swing of the output potential between the collector 20*c* and base 20*b*. After the output potential reaches a negative value at which the branch circuit including asymmetric element 23 becomes conductive, then further increases in output current are not accompanied by substantial changes in the output potential.

The branch circuit including asymmetric element 25 and battery 26 is similarly effective to limit the maximum output potential, being also effective to limit the transistor "fall" time as described above in connection with the sum circuit 1. When the potential difference between the base 20*b* and collector 20*c* exceeds a certain value, it overcomes the potential of battery 26 and a current flows through impedance element 25 which circulates back through resistor 21 and battery 22. The potential drop across resistor 21 produced by this circulating current limits the maximum potential of collector 20*c*. Once this maximum is reached, further decreases in collector current are not accompanied by increases in the collector output potential.

The emitter electrode 20*e* is connected to the grounded base 20*b* through a junction 27, a resistor 28 and a biasing battery 29. The Kirchhoff addition of currents for the two's adder circuit 2 takes place at junction 27. Junction 27 is connected to the input lines 6, 7 and 8 through resistors 30, 31 and 32, respectively.

The sum circuit 1 is provided with sum output terminals 33 and 34, connected respectively to the collector 9*c* and to ground. The two's counting circuit 2 is similarly provided with carry output terminals 35 and 36, connected respectively to the collector 20*c* and to ground.

The inverter circuit 50 is connected between carry output terminal 35 of carry circuit 2 and junction 16 in the input circuit of the sum circuit 1. The inverter circuit 50 comprises a PNP junction transistor 37 having an emitter electrode 37*e*, a collector electrode 37*c* and a base electrode 37*b*. The emitter electrode 37*e* is connected directly to ground. Base electrode 37*b* is connected to ground through a resistor 38 and a biasing battery 39. Collector electrode 37*c* is connected to ground through a load resistor 40 and battery 41. In parallel with the load resistor 40 and battery 41 there is connected a branch circuit including an asymmetric impedance element 42 and a battery 43. This branch circuit is provided to limit the "fall" time of the transistor 37, as mentioned above in the case of transistor 9.

The base electrode 37*b* is connected to the output terminal 35 of carry circuit 2 through a wire 44, a coupling capacitor 45 and a wire 46. A resistor 47 is connected in parallel with capacitor 45. The collector electrode 37*c* is connected through a wire 48 and a resistor 49 to junction 16 in the input network of units counting circuit 1.

OPERATION

The transistors 9 and 20 in the counting circuits 1 and 2 respectively are normally Off, or in a low output current state. The transistor 37 in the inverter circuit 50, on the other hand, is normally On, or in a high output current state.

The transistors are operated as amplifiers between a low output state, for example, a cut-off condition, and a high output state, for example, a saturation condition. They are not stable in either state unless held there by their respective input signals.

The signal generators 3, 4 and 5 are so designed and proportioned with respect to the impedances in the sum circuit 1 that when a signal generator is in its Off condition, it produces a predetermined current flow away from the junction 16, and when the same generator is in its On condition, it produces smaller predetermined current flow away from junction 16. Furthermore, the current flows produced by the three generators 3, 4 and 5 are substantially equal in magnitude.

A brief explanation of the operation of the inverter circuit and its coupling to the sum circuit appears desirable. Consider the loop circuit which may be traced from ground through battery 15, resistor 14, resistor 49, resistor 40, battery 41, and back to ground. In this loop circuit, the batteries 15 and 41 aid each other in sending current around the loop. When transistor 37 is Off, substantially the only current flowing in the whole loop is that due to the batteries 15 and 41. When transistor 37 is On, its output current flows through resistor 40 and battery 41 in the same sense as the loop current. The potential drop across resistor 40 is thereby increased, with the result that the effective potential available to send current through resistor 49 is decreased, and the current flow through that resistor is decreased. Consequently, the current through resistor 49 is high when the transistor 37 is Off, and low when transistor 37 is On.

The impedances in the inverter circuit, particularly the resistor 49, are so designed and proportioned with respect to resistors 14, 17, 18 and 19, that a shift of the inverter circuit from its On condition to its Off condition produces a change in the flow of current away from junction 16 in the same sense and substantially equal in magnitude to twice the change in current flowing away from junction 16 toward one of the signal generators 3, 4 or 5, when the latter shifts from its On condition to its Off condition.

The complete operation of the sum circuit 1 is summarized in the table below. In this table a current has a negative value if it flows away from junction 16, and a positive value if it flows toward that junction. The current flow from junction 16 through a single signal generator in the Off condition is taken as −3, and in the On condition as −1. The current flow through resistor 49 is taken as −2 in the On condition of the inverter circuit, and −6 in the Off condition.

The current flow through resistor 14 is substantially constant, but changes enough to vary the potential drop across it sufficiently to change the transistor 9 between its On and Off conditions. The changes appearing below in the column marked "Sum of signal generator and inverter currents" are accompanied by changes of substantially the same magnitude in the emitter current of transistor 9. While concurrent changes take place in the current flow through resistor 14, they are relatively so small as to be insignificant. It should be understood that the current values set forth in the table are not actual values in any specific units, but are intended to indicate the relative values of the various currents involved.

*Table I*

| Signal Generators | | Sum of S.G. Currents | Inverter Circuit | Current Through Resistor 49 | Sum of Signal Generator and Inverter Currents | Transistor 9 |
|---|---|---|---|---|---|---|
| # On | # Off | | | | | |
| 0 | 3 | −9 | On | −2 | −11 | Off |
| 1 | 2 | −7 | On | −2 | −9 | On |
| 2 | 1 | −5 | Off | −6 | −11 | Off |
| 3 | 0 | −3 | Off | −6 | −9 | On |

In the normal state of the binary adder circuit (first line of Table I), the signal generators 3, 4 and 5 are Off, and the inverter circuit 50 is On. In the carry circuit 2, all the currents flowing away from junction 27 to the signal generators are supplied by a flow from battery 29 through resistor 28. The latter current flow is effective to produce a potential drop across resistor 28 which biases emitter 20*e* to a potential such that transistor 20 is cut off. Since transistor 20 is cut off, the battery 22 is effective through coupling resistor 47 to bias base 37*b* negatively, thereby turning transistor 37 On. The sum of the currents flowing from junction 16 through resistors 17, 18 and 19 is −9, and the current flowing through resistor 49 is −2, making the sum of the signal generator and inverter currents flowing away from junction 16 equal to −11. The current flow through resistor 14 is then sufficient to produce in that resistor a potential drop which holds junction 16 at a potential such that transistor 9 is Off.

Starting with all circuits in the normal state just described, assume that one of the signal generators, for example, generator 3, shifts from its Off to its On condition. The resulting state of the circuits is illustrated in the second line of Table I. In the carry circuit 2, this changes the current flow through resistor 28 so that the potential drop across it decreases and changes the potential of emitter 20e in a positive sense, but the change is not sufficient to turn the transistor 20 On. The inverter circuit 50 therefore remains On, as indicated in the table, and the inverter output current remains at a weighted value of —2. The sum of the signal generator currents flowing away from the junction 16 is now —7. The two generators which are still Off produce a total current flow of —6, and the one which has been turned On produces a current flow of —1. The algebraic sum of the signal generator and inverter currents as they appear at junction 16 is —9. The current flow through resistor 14 is reduced somewhat from its previous value, thereby reducing the potential drop across that resistor and raising the potential of junction 16 and hence of emitter 9e sufficiently to turn transistor 9 On. This response of transistor 9 balances, at least the greater part of the reduction in the current flow away from junction 16 through resistor 17, so that the net change in current flow through resistor 14 is not significant.

It may be seen from the foregoing that a signal from one only of the generators 3, 4 and 5 produces an output signal at the sum output terminals 33, 34, but no signal at the carry output terminals 35 and 36.

Let it now be assumed that the signal generator 4 shifts to its On condition and that the generator 3 continues in its On condition. The various current flows then take on the weighted values indicated in the third line of Table I. The current flow away from junction 27 is now further reduced to a point where the potential drop through resistor 28 is not sufficient to hold the transistor 20 Off, and that transistor turns On. The inverter circuit 50 responds by assuming its low output or Off state so that the current flowing through resistor 49 away from junction 16 assumes its Off value of —6. The sum of the signal generator currents flowing away from junction 16 is now the sum of —3 for the Off generator plus 2×—1 for the two On generators, that sum being —5. The sum of the total signal generator and inverter currents at junction 16 is —11. The potential of junction 16 is restored to the value it had in the normal state of the circuit, described above, and the transistor 9 is now turned Off.

It therefore appears that when signals are received from two of the generators, an output signal is produced at the carry output terminals 35, 36, and that no output signal is produced at the sum output terminals 33, 34.

Now assume that all three of the signal generators simultaneously change to their On conditions. See the fourth line of Table I. The carry circuit 2 remains On and the inverter circuit 50 remains Off. The inverter output current remains at —6. The sum of the signal generator currents is 3×—1, or —3. The sum of the signal generator and inverter currents is therefore —9. As mentioned above, transistor 9 is turned On under such conditions.

It therefore appears that when all three signal generators are On, signals are produced at both the sum output terminals 33, 34 and the carry output terminals 35, 36.

Summarizing, it may be stated that the circuit adds the signals from the generators 3, 4 and 5 and counts them in accordance with the binary system, producing binary output signals at terminals 33, 34 and 35, 36.

The following table shows, by way of example, a particular set of values for the potentials of the various batteries and for the impedances of the various resistors, in a circuit which has been operated successfully. It will be understood that these values are set forth by way of example only and that the invention is not limited to these values or any of them. No values are given for the asymmetric impedance elements, which may be considered to have substantially zero impedance in their forward direction and substantially infinite impedance in their reverse direction.

*Table II*

| | | |
|---|---|---|
| Resistor **10** | ohms | 7500 |
| Battery **11** | volts | 90 |
| Battery **13** | do | 15 |
| Resistor **14** | ohms | 12,000 |
| Battery **15** | volts | 90 |
| Resistors **17, 18, 19** | ohms | 6,200 |
| Resistor **21** | do | 7500 |
| Battery **22** | volts | 90 |
| Battery **24** | do | 5 |
| Battery **26** | do | 15 |
| Resistor **28** | ohms | 16,000 |
| Battery **29** | volts | 90 |
| Resistors **30, 31, 32** | ohms | 4,300 |
| Resistor **38** | do | 750,000 |
| Battery **39** | volts | 90 |
| Resistor **40** | ohms | 21,000 |
| Battery **41** | volts | 90 |
| Battery **43** | do | 15 |
| Capacitor **45** | mmfd | 30 |
| Resistor **47** | ohms | 60,000 |
| Resistor **49** | do | 3,000 |

While I have shown and described a preferred embodiment of my invention, other modifications thereof will readily occur to those skilled in the art, and I therefore intend my invention to be limited only by the appended claim.

I claim:

A binary adder, comprising three input signal generators, each shiftable between low and high conductivity states, respectively representing On and Off signals, a sum circuit, and a carry circuit; said carry circuit comprising a first junction, a first source of unidirectional electrical energy, a first impedance connecting said source to said junction, a first set of three resistors connecting the respective generators to said junction, said generators being poled oppositely to said source with respect to said junction and cooperating with said source to control the potential at said junction in accordance with the number of generators producing On and Off signals, a first transistor having high gain characteristics and asymmetrically conductive emitter, base and collector electrodes, an output network connected to said base and collector electrodes and having low and high conductivity states respectively representing On and Off signals, means connecting said emitter electrode to said junction, and means connecting the terminal of said source opposite the junction to the base electrode, said generators cooperating with said source when no more than one of said generators is On to establish the emitter electrode at a potential to maintain the output network Off, said generators cooperating with said source when at least two of the generators are On to produce a potential drop across said first impedance sufficient to establish the emitter electrode at a potential to hold said output network On, means in said output network to establish the minimum conductivity state thereof at a value substantially equal to the Off conductivity state, so that the conductivity state of the output network is Off when either none or one of said generators is On, means in said output network to establish the maximum conductivity state thereof at a value substantially equal to the On conductivity state, so that the conductivity state of the output network is On when either two or three of said generators are On, carry signal output means connected in said output network to produce an On signal only when said output network is in its high conductivity On state, and an Off signal when said output network is in its low conductivity off state; an inverter amplifier connecting the output network of the carry circuit to the sum circuit, said inverter amplifier including a second transistor of the junction type and having a base electrode, an emitter electrode and a collector electrode, an output network connected between said collector and base electrodes of said second transistor and including a branch circuit having low and high conductivity states, and an input network connected to the base electrode of the second transistor and including means coupling the output network of the carry circuit to the input network of the inverter amplifier and biasing means cooperating with said second transistor to produce in said branch circuit a low (On) current flow when said carry circuit output network is in its low conductivity (Off) state, and a high (Off) current flow when said carry circuit output network is in its high conductivity (On) state; said sum circuit comprising a second junction, a second source of unidirectional electrical energy, a second impedance connecting said second source to said second junction, a second set of three resistors connecting the respective generators to said second junction, means connecting said inverter amplifier branch circuit to said second junction, said generators being poled oppositely to said second source with respect to said second junction and cooperating with said branch circuit connecting means and second source to control the potential at said junction in accordance with the number of generators producing On and Off signals and the current flow in said branch circuit, a third transistor having high gain characteristics and asymmetrically conductive base, emitter and collector electrodes, an output network connected to said base and collector electrodes of the third transistor and having low and high conductivity states, respectively representing Off and On signals, means connecting said emitter electrode of said third transistor to said second junction, and means connecting the terminal of said second source opposite the second junction to the base electrode; said second source, said generators, and said carry and inverter circuits cooperating when one or three of said generators are On to produce through said second impedance a current low enough so that the second source biases said third transistor On and when two or none of said generators are On to produce through said second impedance a greater current flow effective to produce thereacross a potential drop sufficient to overcome said second source and cut said third transistor Off; and signal output means connected in said sum circuit output network to produce an On signal only when said last-mentioned transistor is On.

References Cited in the file of this patent

UNITED STATES PATENTS

| | | |
|---|---|---|
| 2,476,323 | Rack | July 19, 1949 |
| 2,568,932 | Rajchman et al. | Sept. 25, 1951 |
| 2,603,746 | Burkhart et al. | July 15, 1952 |
| 2,627,039 | MacWilliams | Jan. 27, 1953 |
| 2,629,833 | Trent | Feb. 24, 1953 |
| 2,670,445 | Felker | Feb. 23, 1954 |
| 2,671,607 | Williams | Mar. 9, 1954 |
| 2,693,907 | Tootill | Nov. 9, 1954 |
| 2,749,034 | Williams | June 5, 1956 |
| 2,758,787 | Felker | Aug. 14, 1956 |
| 2,895,673 | Williams | July 21, 1959 |

OTHER REFERENCES

Booth: "An Electronic Digital Computer," Electronic Engineering, December 1950, page 497 relied on.

"The Transistor," prepared by Bell Labs., 1951, pages 219, 271.

Williams et al.: A Method of Designing Transistor Trigger Circuits, Proceedings of the Institution of Electrical Engineers (British), vol. 100, part III, Jan. 15, 1953, the date on which proofs were made available to the public, pages 228 to 248.